United States Patent [19]

Renk

[11] 4,253,771
[45] * Mar. 3, 1981

[54] MIXING APPARATUS

[75] Inventor: Paul Renk, Troisdorf, Fed. Rep. of Germany

[73] Assignee: Barmag Barmer Maschinenfabrik Aktiengesellschaft, Remscheid Lennep, Fed. Rep. of Germany

[*] Notice: The portion of the term of this patent subsequent to Dec. 5, 1995, has been disclaimed.

[21] Appl. No.: 964,286

[22] Filed: Nov. 28, 1978

Related U.S. Application Data

[63] Continuation-in-part of Ser. No. 620,783, Oct. 8, 1975, Pat. No. 4,128,342.

[30] Foreign Application Priority Data

Oct. 9, 1974 [DE] Fed. Rep. of Germany ... 7433808[U]

[51] Int. Cl.³ .............................. A21C 1/06; B01F 7/24
[52] U.S. Cl. ......................................... 366/89; 366/318
[58] Field of Search .................. 360/89, 99, 80, 82, 360/77, 92, 318; 366/90

[56] References Cited

U.S. PATENT DOCUMENTS

| 2,200,997 | 5/1940 | Royle | 366/80 |
| 3,174,185 | 3/1965 | Gerber | 366/99 |
| 3,239,882 | 3/1966 | Yokana | 366/82 |
| 4,128,342 | 12/1978 | Renk | 366/99 |

Primary Examiner—Leonard D. Christian
Attorney, Agent, or Firm—John H. Shurtleff

[57] ABSTRACT

An apparatus for the mixing of materials such as synthetic polymers and their additives. The apparatus comprises a casing which surrounds a cylindrical rotor. A series of groove rings are axially arranged in succession in the casing and have end surfaces placing the rings in abutting axial engagement with one another. These end surfaces of each groove ring may be integral therewith or may be provided by separate spacer rings. The grooves formed on the peripheral working surfaces of the groove rings are circumferentially separated by shearing lands and are limited in an axial direction by said end surfaces, said shearing lands and end surfaces defining said grooves as a series of individual closed chambers. In assembly, the grooves formed in the casing groove rings are arranged in a partially overlapping, axially displaced relationship with respect to corresponding radially opposed grooves formed in the rotor in a manner such that the material to be mixed will flow between said overlapping casing and rotor closed groove chambers thereby causing repeated dispersal of the material as it moves through the mixing apparatus.

8 Claims, 10 Drawing Figures

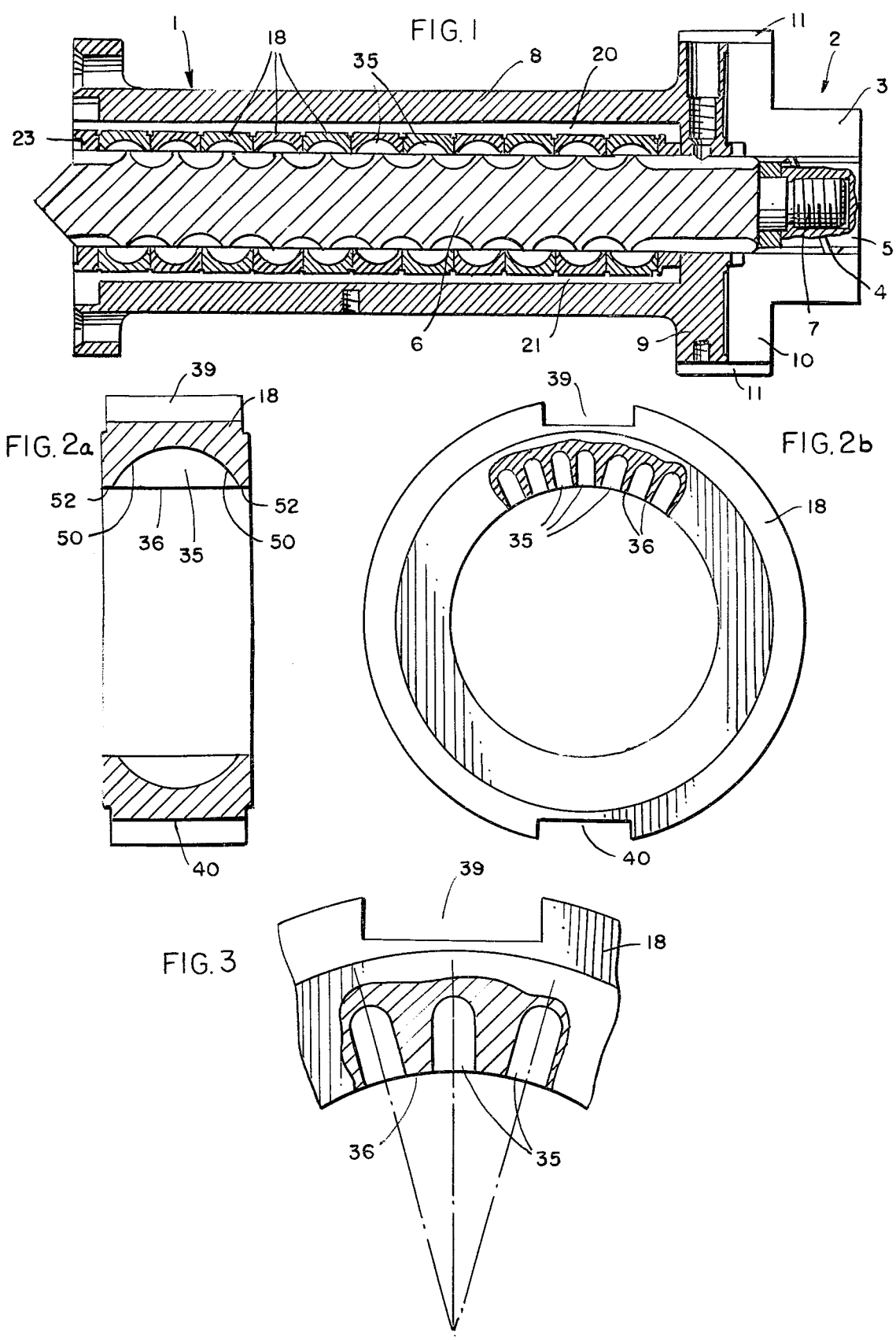

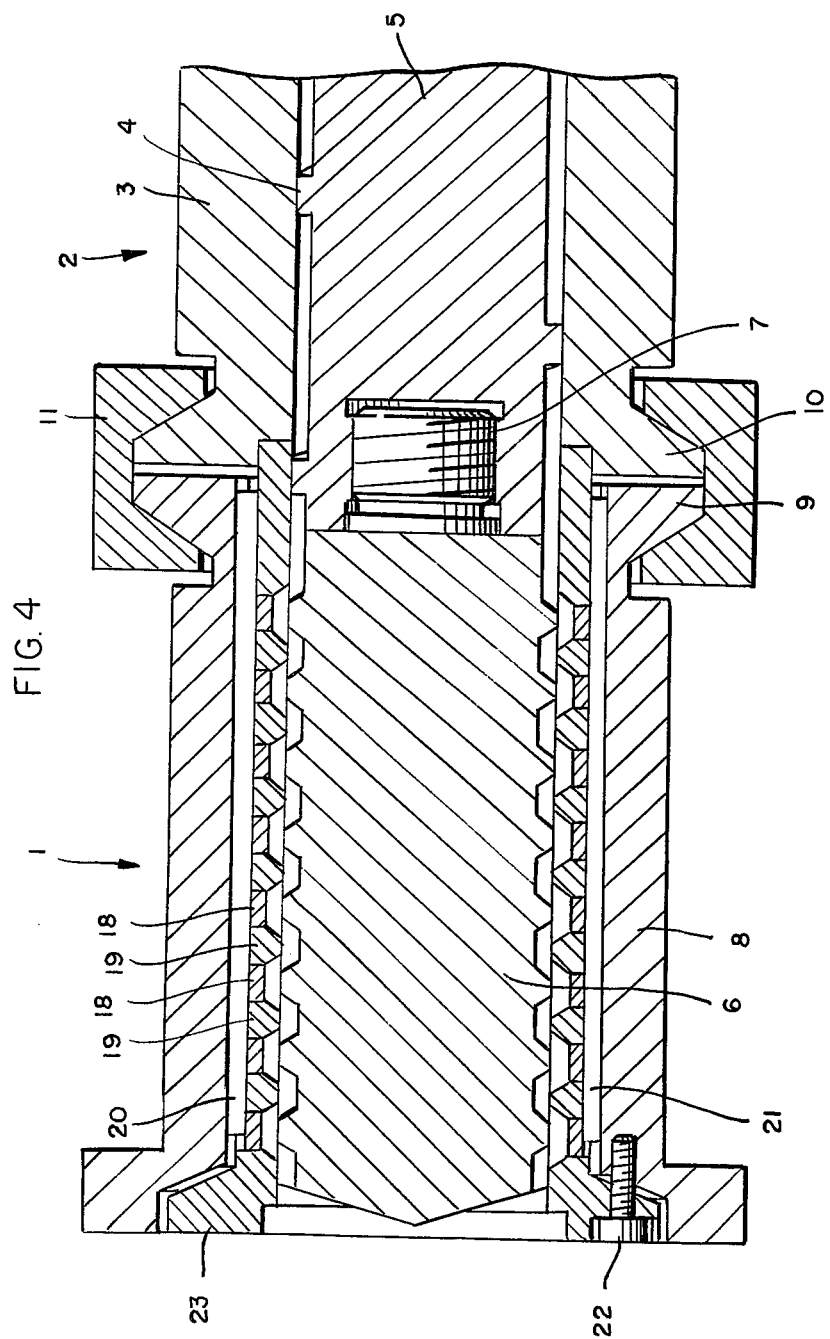

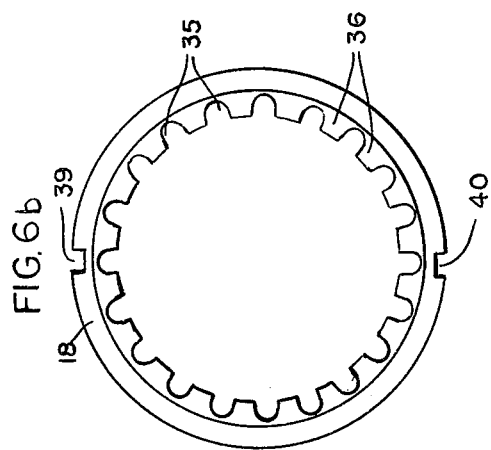
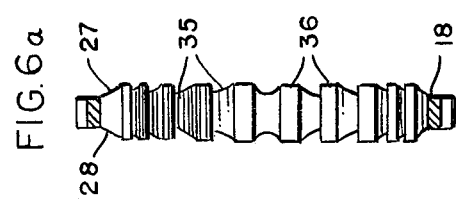
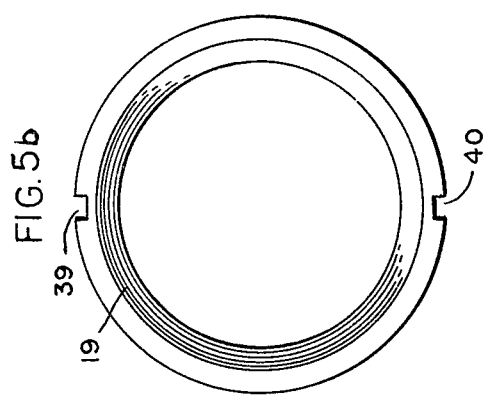
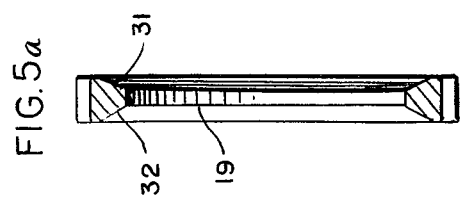
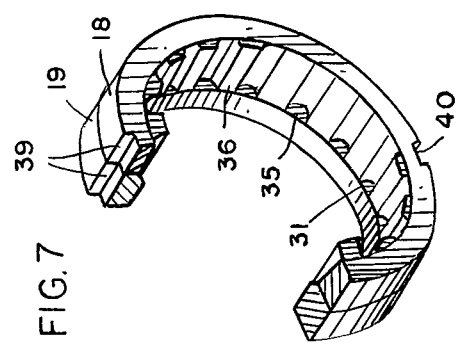

4,253,771

MIXING APPARATUS

This is a continuation-in-part of application Ser. No. 620,783 filed Oct. 8, 1975.

INTRODUCTION

The present invention relates to an apparatus for mixing synthetic plastics, resins and the like, including their additives, and preferably, for mixing and agglomerating heterogeneous pulverulent or powdery mixtures of synthetic thermoplastic polymers. The apparatus consists generally of a drivable cylindrical rotor having a casing surrounding it. On the peripheral working surfaces of the rotor and casing there are provided a system of closed grooves which are separated in the circumferential direction by shear crosspieces or lands.

BACKGROUND OF THE INVENTION

Various devices for mixing synthetic plastics, resins or polymers and their additives, which are added during the mixing process or premixed therewith, and which are especially present as fillers, lubricants, stabilizers, dyes, pigments, antistatic agents and the like, are well-known in the industry. The mixing elements used in such devices differ in construction depending upon whether a dispersive mixing (shearing, dividing) or a distributive mixing (distributing, blending) is sought to be achieved. See generally Schiedrum, *Kunststoffe*, Vol. 63, No. 6, pp. 355–61 (1973). However, the object of such mixing is always the uniform distribution of all elements and additives, possibly added in only very small concentrations, in the base substance. It is possible for the finished mixture to take the form of a material with a solid consistency, for example as in an agglomerate, or as a homogeneous melt.

Such known mixing apparatus as are shown, for example, in German patents DT-PS No. 902,789, DT-PS No. 1,197,438, DT-PS No. 1,198,051 and German published application DT-AS No. 1,529,964, have radially intermeshing mixing or kneading elements, with one set of elements being arranged about a rotor of a screw extruder and rotating therewith, and another set of elements being mounted in a fixed position on the casing enclosing the rotor.

Mixing apparatus of the above type have an inherent drawback in that the design and arrangement of the mixing elements or disk packs do not allow for the simple disassemblage of the apparatus for cleaning, inspection, repair or the like without a relatively great expenditure of time and effort spent in the dismounting and reassembly. In particular, if the radially intermeshing mixing elements are alternately mounted on the rotor and casing, rapid ejection of the rotor is not possible in any event, thereby rendering the apparatus unsuitable for the mixing of materials such as rigid polyvinyl chloride since such rapid ejection is necessarily required for the protection of the machine in the event of a power failure when working such material.

An additional disadvantage of mixing apparatus of the type disclosed in DT-AS No. 1,529,964 is that in order to improve the mixing effect by arranging several mixing elements on the rotor and in the casing, defined gaps must be present between the revolving and fixed mixing elements so as to assure proper mechanical functioning of the device and avoid jamming or butting of axially opposed annular surfaces. However, these axial gaps undesirably bring about variable loading of the material to be mixed in both mechanical and thermal respects and, in consequence, an uncontrolled and unpredictable flow process which prevents the optimal reproducible mixing of the materials being treated. For example, the varying mixing times of such devices in the case of thermally sensitive plastics or resins will lead to damage of mixed materials and to an inhomogeneous and generally non-uniform quality of the resulting product.

In addition to the above-described devices, there are also known mixing apparatus of the type disclosed in German Pat. No. DT-PS 1,037,698 in which systems of grooves or furrows lie opposite one another and extend in axial directions along a drivable cylindrical rotor having little radial play and a surrounding casing. These groove systems are separated circumferentially by shear crosspieces or lands which do not engage one another.

However, in spite of the advantage of rapid disassembly of such devices through the axial ejection of the rotor from within the casing, such apparatus exhibit certain drawbacks in the mixing process in that the shearing and mixing of the materials with their additives takes place in an inherently uncontrollable manner and only relatively large agglomerates are ground or pulverized between the shear lands. The material passing through such devices will be essentially sheared only once in the longitudinal direction and distributed on the grooves of the rotor and casing. Beyond this initial shearing, it is left to chance whether the particles will be again subjected to a discrete shearing action as they proceed through the device since it is not necessary that radial flow of the particles take place beyond this point between the grooves and shearing lands of the rotor and casing.

A further disadvantage experienced with such mixing devices is that the groove systems are not self-cleaning so that stoppages often times occur, to the detriment of the homogenity of the mixture and resulting product quality, as a result of, for example, a build-up of insufficiently melted agglomerates in such grooves.

The above-discussed disadvantages can largely be eliminated through an arrangement of the groove systems in the manner disclosed by U.S. Pat. No. 3,174,185. With such an arrangement, several groove systems are mounted on the rotor and in the casing in axial succession and are axially shifted with respect to one another. Due to this axial interruption of the grooves, there is created in a simple manner a forced flow of the material back and forth between the groove system of the rotor and the groove system of the casing which insures improved shearing and mixing of the material as it flows through the apparatus. However, the production of such groove systems is quite expensive due to the extensive and difficult machinery required, particularly when forming such grooves in the casing. This is especially a problem when the inside diameter of the casing is relatively small.

BRIEF DESCRIPTION OF THE INVENTION

The present invention eliminates the above-described problems and disadvantages found with known mixing devices by providing a mixing apparatus having a simple, axially disassemblable rotor and grooved systems formed on the rotor and in the casing which insure controllable shearing and mixing of the material flow through the device. In addition, the grooved systems of the present invention are designed in such a manner that they may be inexpensively manufactured and are easily adapted to meet differing requirements for mixing quality and efficiency.

The mixing apparatus of the present invention comprises a casing which surrounds a cylindrical rotor. A series of groove rings are axially arranged in the casing and may also be similarly arranged on the rotor. The grooves formed on the peripheral working surface of the groove rings are circumferentially separated by shearing lands and are limited in an axial direction by end surfaces, the shearing lands and end surfaces defining the grooves as a series of individual closed chambers. In assembly, the grooves formed in the casing groove rings are arranged in a partially overlapping, axially displaced relationship with respect to corresponding radially opposed grooves formed in the rotor so that the material to be mixed will flow between the overlapping casing and rotor closed groove chambers thereby causing repeated dispersal of the material as it moves through the mixing apparatus. Due to the modular nature of profile rings, the length, and therefore, mixing effectiveness of the apparatus may be easily extended to meet varying mixing requirements.

The grooves of the present invention may be formed such that their base extends in the axial direction, or they may be formed in an oblique angular direction with respect to the longitudinal axis of the mixing apparatus, thereby providing a conveying effect to the materials as they are carried through the machine. The advantages of utilizing such obliquely formed grooves are well-known in the art and such an arrangement is described, for example, at page 2, lines 101–110 of British Pat. No. 841,743.

In a preferred embodiment of the present invention, a single type of ring is utilized which has grooves formed in its peripheral working surface. The grooves are formed as circular arc segments having their longitudinal chord base extending substantially parallel to the axis of the mixing apparatus. An axially directed web is formed along the peripheral working surface of the groove ring between the lateral edge of the groove ring and the end surfaces of the circular arc segments where the segments intersect the working surface of the ring. A plurality of the rings are then tandemly joined and positively locked in the casing and, if desired, along the rotor shaft. However, a series of groove and spacer rings may also be utilized in accordance with the present invention wherein the grooves formed in the groove rings are bound along their longitudinal side faces by the side faces of the alternately arranged spacer rings.

In addition, in a further preferred embodiment of the present invention, the zones of the grooves formed in the rotor where the conveyed material enters the grooves are arranged opposite the zones of the grooves formed in the casing groove rings where the conveyed material exits the grooves and vice-versa. This arrangement compells a continuous flow of the material between the rotor and casing groove rings due to the fact that the groove systems have only a limited axial length and they must, therefore, deflect the material radially at their outflow as it is conveyed through the mixing apparatus. This continuous deflection of the material over the shearing lands of the grooves further enhances the mixing effect of the device.

The mixing apparatus of the present invention may be connected to the ejection end of a screw extruder if so desired. In such arrangements, it is desirable to construct the diameter of the mixing apparatus larger than the diameter of the screw portion of the extruder since this allows a large number of grooves to be formed on the periphery of the groove rings and increases the mixing effect by increasing the radial velocity component of the material being processed.

DESCRIPTION OF THE DRAWINGS

FIG. 1 is a longitudinal view in section of a mixing apparatus constructed in accordance with an embodiment of the present invention;

FIGS. 2a, 2b are enlarged cross-sectional and end elevational views of the casing groove ring portions shown in FIG. 1;

FIG. 3 is an enlarged view of a portion of the casing groove ring shown in FIG. 2b;

FIG. 4 is a longitudinal view in section of a mixing apparatus similar to that shown in FIG. 1 constructed in accordance with an alternate embodiment of the present invention;

FIGS. 5a, 5b are cross-sectional and elevational views of the casing spacer ring portions shown in FIG. 4;

FIGS. 6a, 6b are cross-sectional and elevational views of the casing groove ring portions shown in FIG. 4; and FIG. 7 is a perspective view of the axial intermeshing of the casing groove and spacer rings.

DESCRIPTION OF THE PREFERRED EMBODIMENT

FIG. 1 illustrates an embodiment of a mixing apparatus 1 constructed in accordance with the present invention which is connected to the ejection end of a screw extruder 2. The screw extruder comprises generally a central root section 5 having a ridge or flight portion 4 formed about its outer surface in a continuously winding manner and an outer cylinder 3. Rotor 6 of the mixing apparatus 1 is connected at the ejection end of the screw extruder 2 by means of extending portion 7 which is mounted in a corresponding receiving section formed in the head of root section 5. The casing 8 of the mixing apparatus which concentrically surrounds rotor 6 is connected to outer cylinder 3 of the screw extruder by means of flanges 9,10 formed on the abutting ends of the casing and cylinder. The flanges 9,10 are securely joined by the usual type of clamp 11. In an alternative embodiment of the apparatus, casing 8 of the mixing apparatus 1 may be constructed as one piece with outer cylinder 3 of screw extruder 2. However, the flanged embodiment is preferred since the flexibility of the extruder is increased and the mixing apparatus may be altered at little cost to meet changed conditions by using, for example, an extended casing with a greater number of mixing elements.

In casing 8 there are arranged in axial succession a series of groove rings 18 which are mounted in abutting axial engagement with one another. These groove rings are secured in casing 8 by means of keys 20,21 in order to prevent them from twisting thereabout during the operation of the mixing apparatus. An inset ring 23 which is removably mounted on the end of casing 8 axially secures the groove rings 18 therein.

As was noted above, groove rings corresponding to casing groove rings 18 may be utilized on rotor 6 if desired. However, since it is not as difficult or expensive to form such grooves directly on the outer peripheral working surface of the rotor, as opposed to the inner working surface of the casing, it is not in all cases necessary or desirable to utilize such rotor groove rings.

Referring now to FIGS. 2a, 2b, and 3, groove ring 18 has formed in its inner peripheral working surface grooves 35 which are peripherally distributed and substantially parallel to the axis of said casing. Grooves 35 have a rounded groove base surface (FIGS. 2b and 3) and are formed as a circular arc segment (FIG. 2a) having its longitudinal chord base extending substantially parallel to the axis of the casing. This formation of the grooves avoids corners where the material can settle and possibly remain far too long of period thereby causing decomposition of it.

The grooves are circumferentially separated about the ring by shear lands 36 which define the inner diameter of the ring. Grooves 35 are limited in an axial direction by end surfaces 50, said shear lands 36 and end surfaces 50 defining the grooves as a series of individual closed chambers. This closed chamber arrangement of the groove rings 18 insures that an overflow of the material to be mixed within the grooves is prevented or can only take place by shearing the material over shear lands 36. It has also been found that the conveying effect imported to the material as it passes through the machine can be increased if desired by forming grooves 35 in a slightly oblique angular direction with respect to the longitudinal axis of rings 18. The above-described keys 20,21 respectively engage longitudinal keyway grooves 39,40 formed on groove rings 18 in order to prevent twisting of the rings about the casing during the operation of the device.

Since the circular arc segment of grooves 35 does not extend to the lateral edges of the groove rings 18, a narrow axially directed web 52 is formed along this portion of the groove rings. In this manner, the webs 52 of two adjacent rings (FIG. 1) replace the spacer ring necessary with the alternate embodiment of the invention (FIG. 4). Hence, only one type of groove ring is necessary in the casing of the mixing apparatus. The mixing action which occurs between the casing and rotor grooves will be discussed in detail below in connection with the alternate embodiment of the present invention.

An alternate embodiment of the present invention is shown in FIGS. 4 through 7. The number identification of corresponding parts of the mixing apparatus have been kept consistent with the above-described embodiment for the sake of simplicity.

In this embodiment of the present invention, outer profile rings 18,19 are arranged in an axially interlocking, alternate closed linkage relationship about the inner surface of casing 8. These outer profile rings are secured on casing 8 in order to prevent twisting thereabout by means of keys 20,21. Profile ring 18, which is also referred to hereinafter as the casing groove ring, is illustrated in detail in FIGS. 6a, 6b, and profile ring 19, which is also referred to hereinafter as the casing spacer ring, is illustrated in detail in FIGS. 5a, 5b. These outer profile rings are axially secured within casing 8 by means of an inset ring 23 which is removably mounted on the end of the casing by bolts 22. Groove rings 18 have side faces 27,28, which engage corresponding side faces 31,32 of spacer rings 19, in a snugfitting relationship in the axial direction. The engagement of the groove rings and spacer rings is best illustrated in the perspective view of FIG. 7.

Referring now in particular to FIG. 7, groove ring 18 has formed on its inner circumference peripherally distributed, axially parallel longitudinal grooves 35. Grooves 35 have a rounded groove base with a trapezoidal axial profile and are circumferentially separated about the ring by shear lands 36 which define the inner diameter of the ring. Longitudinal grooves 35 are closed along their sides by the side faces 31,32 of spacer ring 19. This enclosure of the groove ring insures that an overflow of the material to be mixed within the grooves is prevented or can only take place by shearing the material over shear lands 36. Keys 20,21 respectively engage longitudinal keyway grooves 39,40 formed on groove rings 18 and spacer rings 19 in order to prevent twisting of the rings about the casing.

The outer diameter of rotor 6 is slightly smaller than the inner diameter of outer profile rings 18,19 in order to accomodate the small radial play of the rotor. The width of the rings is preferably such that the length of the grooves formed in the casing groove rings will always correspond to the grooves formed in the rotor. The length of the shearing zone is dependent on the selected length of the groove inlet and groove outlet zones and is yielded from the side face angle of the profile rings.

FIG. 7 illustrates the assembly of the casing groove and spacer rings in perspective representation. It is to be noted that the rings alternately engage one another snugly and that the groove system provided in groove rings 18 is bound axially by spacer rings 19.

As is shown in FIG. 1, the grooves formed in both the casing groove rings and on the rotor are arranged in an alternate sequence so that opposite each groove ring in the casing there lies a spacing land on the rotor and vice-versa. In this manner material flow is assured through the deflection of the material back and forth from the exit zones of the groove system of the casing into the correponding entry zones of the groove system of the rotor and from the rotor back to the casing, etc. The above-described entry and exit zones being that portion of each groove adjacent spacer rings 19 of the casing and the corresponding zones of the rotor into which the material enters the groove and from which it exits the groove as the material stream passes through the machine. Due to the axial displacement of the grooves by the spacing lands in both the casing and rotor, it is impossible for the material to undesirably flow between groove systems lying one after the other on either the casing or rotor without the above-described deflection first taking place.

While several particular embodiments and examples of the present invention have been shown and described, it should be understood that various obvious changes and modifications thereto may be made, and it is therefore intended in the following claims to include all such modifications and changes as may fall within the spirit and scope of this invention.

What is claimed is:

1. An apparatus for mixing materials such as synthetic polymers and their additives, said apparatus comprising:
   a casing surrounding a cylindrical rotor,
   a series of groove rings axially arranged in sequence in said casing and end surface means placing the rings in abutting axial engagement with one another,
   said groove rings having grooves formed in their peripheral working surfaces which are circumferentially separated by shearing lands and which are limited in an axial direction by said end surface means, said shearing lands and end surface means defining said grooves as a series of individual closed chambers, a series of radially opposed grooves located on the peripheral working surface of said rotor which correspond to the grooves formed in said casing groove rings, and said grooves formed in said casing groove rings being arrranged in a partially overlapping, axially displaced relationship with respect to said radially opposed grooves on said rotor so that the material will flow between said overlapping casing and rotor closed groove chambers thereby causing repeated dispersal of the material as it moves through the mixing apparatus.

2. The mixing apparatus of claim 1 wherein said rotor grooves are formed in the peripheral working surface of said rotor.

3. The mixing apparatus of claim 1 wherein said rotor grooves are formed in the peripheral working surface of a series of groove rings which are axially arranged in sequence on said rotor and which are in abutting axial engagement with one another.

4. The mixing apparatus of claim 1 wherein said grooves are formed as circular arc segments having their longitudinal chord base extending substantially parallel to the axis of said casing and rotor.

5. The mixing apparatus of claim 4 wherein an axially directed web is formed along the peripheral working surfaces of said groove rings between the lateral edges of said groove rings and the end surfaces of said circular arc segments where said segments intersect said working surfaces.

6. The mixing apparatus of claim 4 wherein the base surface of said circular arc segments have a generally rounded shape in cross section.

7. The mixing apparatus of claim 1 having a series of separate spacer rings in said casing forming said end surface means and being placed between a pair of respective groove rings for axial engagement therewith.

8. The mixing apparatus as claimed in claim 1, 2, 3, 4, 5, or 6 wherein said end surface means are formed as an integral part of each of said groove rings.

* * * * *